United States Patent
Ternasky et al.

(10) Patent No.: US 7,880,918 B2
(45) Date of Patent: Feb. 1, 2011

(54) SYSTEM AND METHOD FOR GENERATING UNIFIED IMAGE OUTPUT

(75) Inventors: Joseph D. Ternasky, Mountain View, CA (US); Robert L. C. Parker, San Jose, CA (US); Michael M. Byrd, Bellevue, WA (US); Adam Eversole, Redmond, WA (US); Joseph King, Seattle, WA (US); Michael Stokes, Eagle, ID (US)

(73) Assignee: Microsoft Corporation, Redmond, WA (US)

( * ) Notice: Subject to any disclaimer, the term of this patent is extended or adjusted under 35 U.S.C. 154(b) by 1170 days.

(21) Appl. No.: 10/848,043

(22) Filed: May 19, 2004

(65) Prior Publication Data

US 2005/0259115 A1    Nov. 24, 2005

(51) Int. Cl.
  *G09G 5/00* (2006.01)
(52) U.S. Cl. .................. 358/1.18; 358/1.2; 345/619; 345/660
(58) Field of Classification Search ............... 358/1.12, 358/1.18, 1.2, 1.16, 1.9, 1.15, 1.1, 1.14, 1.13; 345/619, 660; 715/500; 707/102
  See application file for complete search history.

(56) References Cited

U.S. PATENT DOCUMENTS

| | | | | |
|---|---|---|---|---|
| 5,638,498 A * | 6/1997 | Tyler et al. | ................ | 358/1.18 |
| 6,426,798 B1 * | 7/2002 | Yeung | .................... | 358/1.13 |
| 6,952,831 B1 * | 10/2005 | Moore | .................... | 719/327 |
| 6,965,440 B1 * | 11/2005 | Nakagiri et al. | .......... | 358/1.12 |
| 7,084,998 B2 * | 8/2006 | Blair et al. | .............. | 358/1.15 |
| 7,327,482 B2 * | 2/2008 | Ferlitsch | ................ | 358/1.15 |
| 2003/0090705 A1 * | 5/2003 | Ferlitsch | ................ | 358/1.15 |
| 2003/0103227 A1 * | 6/2003 | Tomomatsu | ............ | 358/1.13 |
| 2003/0160977 A1 * | 8/2003 | Nishikawa et al. | ......... | 358/1.2 |
| 2003/0227640 A1 * | 12/2003 | Liang et al. | .............. | 358/1.13 |
| 2004/0027594 A1 * | 2/2004 | Suzuki et al. | .............. | 358/1.2 |
| 2004/0080779 A1 * | 4/2004 | Kawamoto | ............... | 358/1.14 |
| 2004/0085551 A1 * | 5/2004 | Serisky et al. | .............. | 358/1.1 |
| 2004/0181780 A1 * | 9/2004 | Shiu | ......................... | 717/121 |
| 2005/0078327 A1 * | 4/2005 | Majewicz | ................ | 358/1.9 |

* cited by examiner

*Primary Examiner*—King Y Poon
*Assistant Examiner*—Allen H Nguyen
(74) *Attorney, Agent, or Firm*—Shook, Hardy & Bacon LLP

(57) ABSTRACT

A system and related techniques generate a unified representation of graphical representations, such as documents, graphic images or others, for displaying on a display screen, printing on a printer, faxing via a facsimile machine or outputting in other ways. In embodiments a media integration layer, which may reside in the operating system level, may generate renderings from graphics primitives, and send that rendering via a mediation engine to a device driver, for instance a print engine located in a printer. The device engine may return a preview of the output representation to the media integration layer for adjustments or to accept and print the output, all without a necessity for or reliance upon a device-specific driver in the operating system. Since both the display screen and the output device operate off of the same base representation, neither the display nor output device needs to attempt to emulate the output characteristics of the other, and screen-to-print uniformity may be enhanced.

29 Claims, 4 Drawing Sheets

SYSTEM AND METHOD FOR GENERATING UNIFIED IMAGE OUTPUT

CROSS REFERENCE TO RELATED APPLICATIONS

The subject matter of this application is related to the subject matter of co-pending U.S. patent application Ser. No. 10/693,630 filed Oct. 23, 2003 entitled "Media Integration Layer", and to the subject matter of U.S. patent application Ser. No. 10/836,327 filed Apr. 30, 2004, entitled "Document Markup Methods and Systems", which applications are each assigned or under obligation of assignment to the same entity as this application, and each of which applications is incorporated by reference herein

STATEMENT REGARDING FEDERALLY SPONSORED RESEARCH OR DEVELOPMENT

Not applicable.

FIELD OF THE INVENTION

The invention relates to the field of computing, and more particularly to systems and techniques to generate consistent representations of graphical image outputs, such as documents intended to be printed, faxed, captured or otherwise rendered or output, including to preview those objects before printing or other output.

BACKGROUND OF THE INVENTION

The goal of affording computer users the ability to print, fax or otherwise output document, image or other output exactly as they see the content on screen has been a perennial but elusive one. While the objective of what-you-see-is-what-you-get (WYSIWYG) output has been pursued in the marketplace for some time, obstacles to truly consistent screen-to-print and other output remain.

The difficulty in generating consistent output is in part related to the differing approaches used to try to unify the depiction of documents, graphic images and other output representations. On the one hand, the approach can be taken that an output representation on the user's screen should be conformed to the output characteristics of the target printer or other output device. This approach is exemplified for instance by the Display PostScript™ system, a display rendering platform which attempts to limit and match the rendering functionality on the desktop to that which is provided by target printers or other devices. This may severely constrain the available output on an average CRT or LCD display, which may be able to render to much higher color or grayscale resolution, for example, than a printer.

Conversely, the approach can be taken to try to emulate or conform the output characteristics of a printer, fax or other output device to the same characteristics as the computer desktop display, as for example generally illustrated in FIG. 1. This approach may be typified for example by the use of the Graphic Device Interface (GDI) dynamic link libraries (DLLs) to drive print or other output operations. However among other drawbacks GDI technology may impose a performance penalty on printed or other output.

When either the desktop screen or the output device attempt to emulate the other, complications may also arise in other ways. Those difficulties can result in part from the fact that the output characteristics, such as resolution, color depth and others, of the desktop or other source screen rarely if ever match or even approximate the output characteristics of the printer or other output device. Therefore perfectly accurate emulation by one device of the other may be difficult or impossible, even in principle.

Compounding the mismatch between the two sides of the hardware, the display driver for the desktop screen and the device driver for the printer may moreover not be one in the same software. The device-specific drivers for the display and for the printer may take different approaches and make different assumptions about how a graphical object may be represented and ultimately rendered, for example implementing operations such as halftoning, interpolation, kerning and other effects differently. A preview of print output on the user's screen may therefore show an accurate representation of what the video display system will generate for the document or other content, but not for the printer, facsimile or other output device. Other problems in document and other graphical output technology exist.

SUMMARY OF THE INVENTION

The invention overcoming these and other problems in the art relates in one regard to a system and method for generating unified image output, in which the rendering of images on a computer display and the rendering of printed or other output is mediated and controlled by a unified platform. In embodiments, an operating system running on a computer system or other host may contain a media integration layer which generates ad manages representations of documents, images or other textual or graphical output. The image representation may be transmitted via a mediation engine to an output device such as a printer, facsimile or other output hardware, where the image representation may be received in a device engine, such as a hard-coded printer engine. The printer driver or other device engine may generate a corresponding output page, and in embodiments transmit that generated output page as a preview back to the host. A user may add adjustments to the preview, and activate the printing or other output. Because neither the display device nor the printer or other output device attempts to emulate the other but instead both work from a common rendering resource, output uniformity is enhanced and the need for a device-specific output driver may be reduced or eliminated.

DETAILED DESCRIPTION OF EMBODIMENTS

Figure 1:
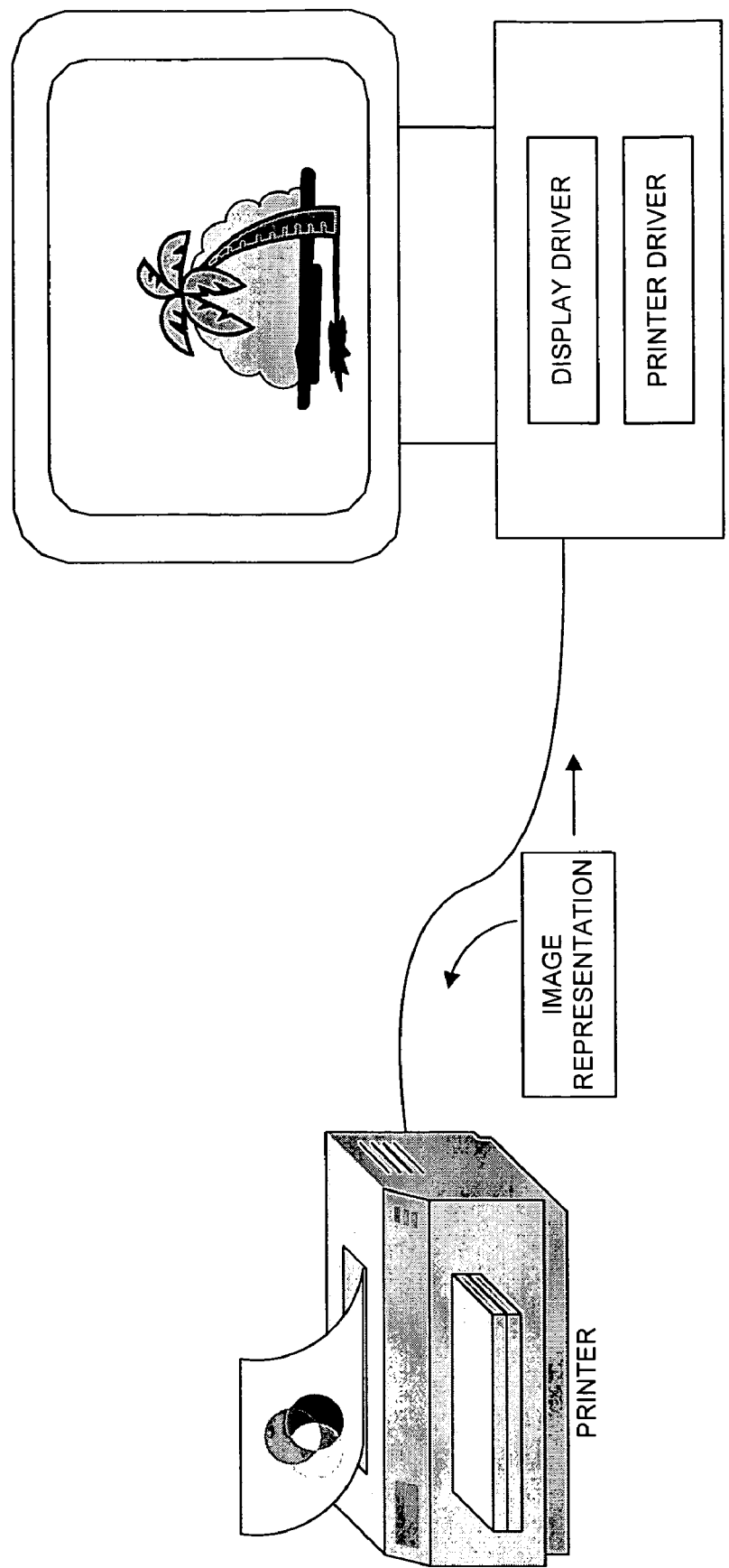
FIG. 1 illustrates a diagram of print rendering technology, according to conventional implementations.
Figure 2:
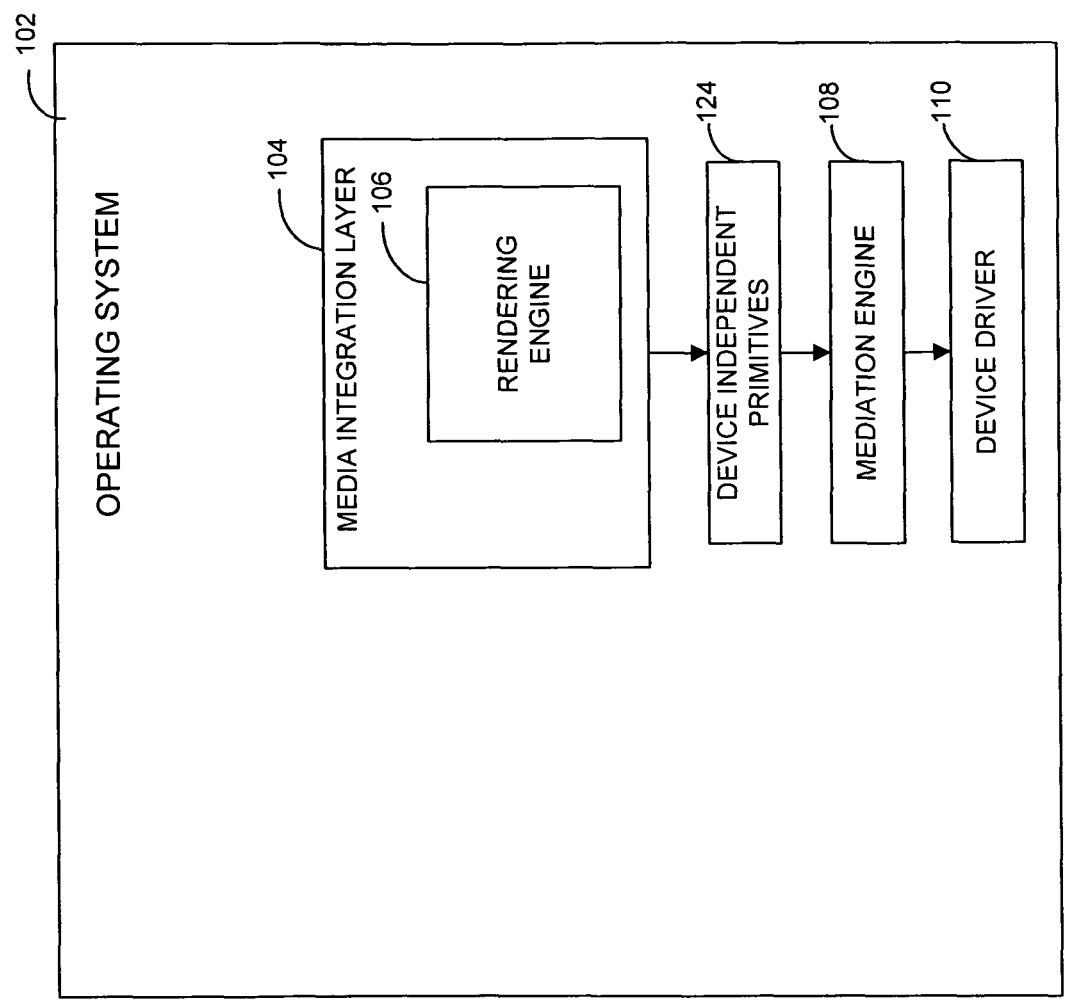
FIG. 2 illustrates a logic diagram of image output rendering, according to an embodiment of the invention.

FIG. 2 illustrates components and resources which in general may cooperate to generate a unified output representation of a textual document, graphical image or other object or representation, according to embodiments of the invention. As illustrated in that figure, an operating system 102 of host 112 may contain or embed a media integration layer 104, such as a media layer in the Microsoft Windows™ family of operating systems. Other operating systems and platforms may use or incorporate aspects of the invention to generate unified screen-to-printed page and other output. In embodiments the media integration layer 104 may receive and integrate all graphical and other content, and in one regard express or translate that content into a comparatively compact set of graphical or other output primitives.

According to the invention in that regard, the media integration layer 104 may contain or interface to a rendering engine 106 to generate and manage graphical or other output. Rendering engine 106 may accept graphics objects, primitives or other commands or data to build objects or constructs for ultimate output or display. For instance, rendering engine 106 may contain programming and logic to generate bit-mapped, raster-based or other graphics output, for instance based on graphics primitive objects such as standard rectangles, circles or other shapes, effects or objects. The rendering engine 106 may in turn generate a set of device independent primitives 124, which may be or include a bitmap or other representations of the subject primitive or graphical or other object. According to embodiments of the invention in one regard, rendering engines and associated resources of the types described in the aforementioned co-pending U.S. patent application Ser. No. 10/693,630 may be incorporated in or be accessed by rendering engine 106. According to embodiments of the invention in another regard, the device independent primitives 124 may be, include or interface to a set of standardized graphical or other output functions or effects, such as those incorporated in or enabled by Microsoft DirectX™ graphical output technology, or other platforms.

The device independent primitives 124 so generated may in turn be communicated to a mediation engine 108 for the management and transmission of output effects, instructions or other code or data to output hardware. The mediation engine 108 may as shown likewise be embedded in operating system 102, or in embodiments may be deployed in other configurations such as outside the operating system itself. The mediation engine 108 may in turn communicate with a device driver 110, such as a printer driver, facsimile or other driver which may, for instance, include code or instructions implemented by or for a specific manufacturer's hardware or device.

In embodiments, the mediation engine 108 may detect or identify functions or effects available in device driver 110 which may be optimized or enhanced for a specific output device, such as a printer, facsimile machine, copy machine, multifunction or other machine or device. In such cases the mediation engine 108 may automatically access that device-specific functionality for purposes of negotiating higher quality or otherwise enhanced output, for example by substituting or adding routines, code or data in device driver 110 for or to those contained in device independent primitives 124. For example, specific fonts, path types, image formats or other data or instructions specially supported by device driver 110 may be generated according to those native formats rather than in device independent primitives 124.

Conversely, functions, effects, primitives or other data or commands which are not specific to or optimized for particular hardware, or which may be optimally expressed in device independent primitives 124, may in embodiments automatically revert to the code, commands or other data available in or supported by the device independent primitives 124. According to embodiments in another regard, in cases in which device independent primitives 124 may not be directly or fully supported by the output device 114, the mediation engine 108 may render those primitives or related commands or data directly to bitmap, texture or other form before transmission to output device 114. In cases where device independent primitives 124 contain instructions, effects or other code or data substantially in common or compatible with those of device driver 110, device driver 110 may not need to be invoked to generate desired output. In further embodiments, one or more functions, instructions, code or data in device independent primitives 124 may likewise be combined to generate or emulate native device or more advanced effects.

Figure 3:
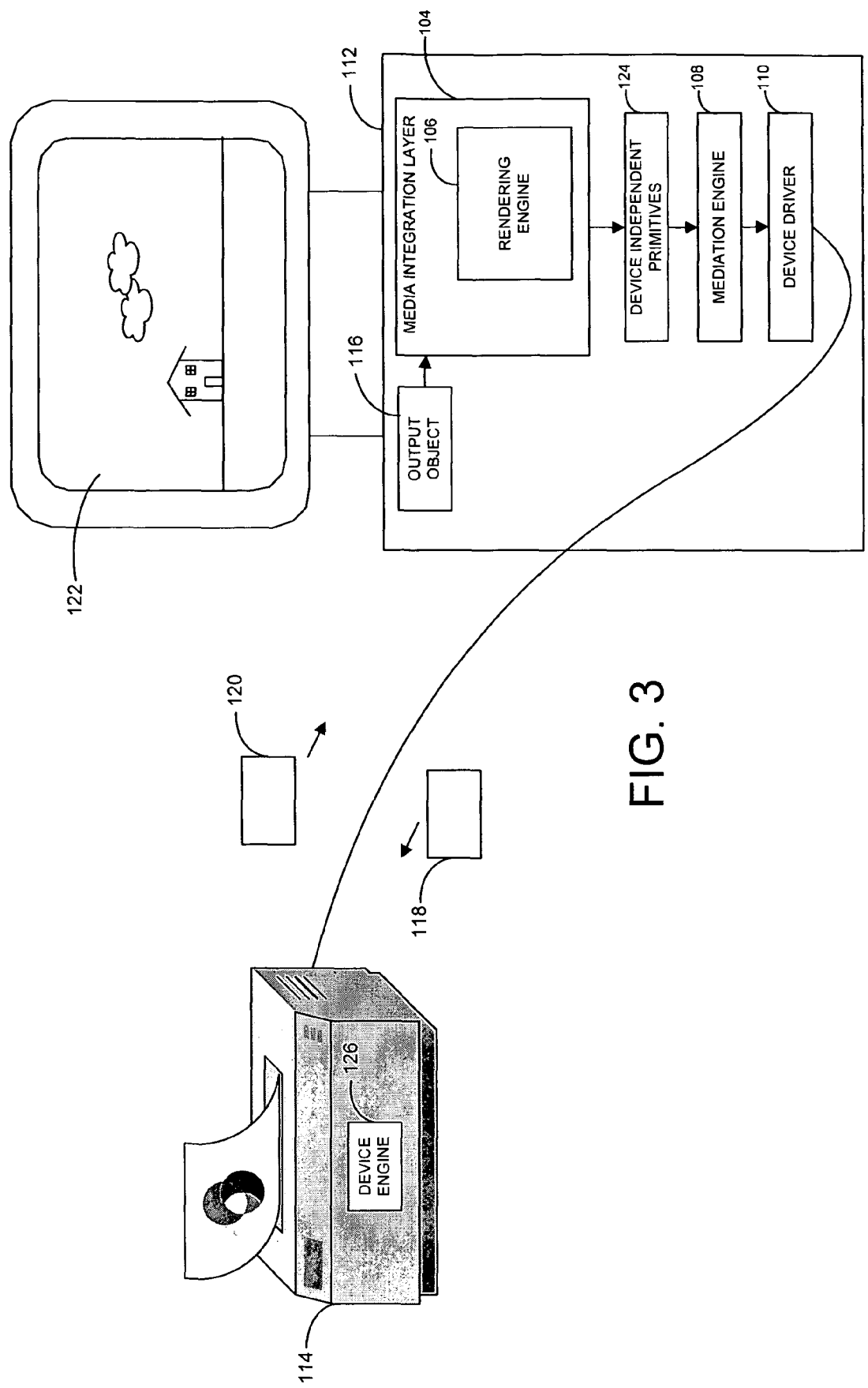
FIG. 3 illustrates a printing output operation, rendered according to an embodiment of the invention.

FIG. 3 illustrates advanced output operations according to embodiments of the invention in another regard, including print preview operations. In embodiments as shown the media integration layer 104 may receive an output object 116 which may for example or encapsulate a displayed output object 122 such as an image or other textual, graphical or other object or content, for purposes of rendering that content to output via the mediation engine 108 and related resources. In embodiments, the output object 116 may be or include a representation of a variety of textual, graphical or other objects, content or commands, including for example a word processing document, a page layout from a publishing program, a slide from a Power Point™ or other slideshow or other presentation tool, a screen capture, Adobe™ portable document format (PDF™) files, a stored, streamed or other graphical image such as one or more images stored in JPEG, GIF, TIFF or other formats, a downloaded image file such as digital photographs from a digital camera or other image capture device, or other bitmapped, raster-mapped, text-encoded or other objects or representations, or combinations of the same.

According to embodiments of the invention in one regard, the media integration layer 104 may receive the output object 116 or other graphical, textual or other object or command and render that content for output and other purposes. For example, media integration layer 104 may invoke rendering engine 106 to subject the output object 116 to various processing steps, for example to generate an appropriate set of halftone or grayscale values to display, print or otherwise manipulate the output object 116 or other content. Other processing, such as scaling, highlighting, adjusting color depth, kerning, interpolation or other adjustments to graphical or other characteristics of output object 116. In embodiments a graphic device language (GDL) may be applied to output object 116 to generate those processing effects.

The rendering engine 106 may accordingly generate a set of device independent primitives 124 encapsulating or representing the output object 116, and transmit the corresponding device independent primitives 124 to mediation engine 108 to condition them for output in the form of an output representation 118. For example the mediation engine 108 may examine the device independent primitives 124 and determine that no special or extended print or other output routines or resources may be required from device driver 110 or other sources to output the output representation 118 of the output object 116.

The mediation engine 108 may then transmit the output representation 118 to output device 114, which device may be or include a printer, facsimile machine, copy machine, multifunction machine, film production machine, or other output device or associated media. According to embodiments of the invention in one regard, the output representation 118 may be or include an electronic document of the type described in the aforementioned U.S. patent application Ser. No. 10/836,327 filed Apr. 30, 2004, entitled "Document Markup Methods and Systems". When output representation 118 is encoded in an electronic document of that type, further optimizations on the output representation 118 or its output operation may be performed, for instance to dynamically re-order document blocks or components for increased first-page out times, or to enhance other performance or other variables. Output representation 118 may in embodiments likewise be embedded or expressed in other document types or formats, including for instance extensible markup language (XML) and others.

According to embodiments in another regard, the output representation 118 may contain commands, data or characteristics of the image content in parameters available to or compatible with the output device 114, without further conversion or transformation, or a necessity to invoke device-specific resources to achieve output. For example, the output representation 118 may express a set of halftones within the physical range of the output device 114, or at a fixed hardware resolution appropriate to the output device 114. It may be noted that the same output object 116 upon which output representation 118 is based may likewise be used to drive the user's video or other display, so that screen-to-printed page or other output may be kept comparatively consistent without the necessity of additional transforms, drivers or rendering.

The output device 114 may receive the output representation 118, and transfer that representation to a device engine 126 to prepare a printed page, facsimile page, film strip or other media or output. For example device engine 126 may be, include or interface to, for example, a printer driver or other resources to specify laser pixel, line or inkjet placement, color gamut or other output characteristics to generate an output of the output representation 118. Device engine 126 may include electronic memory such as EPROM (electronically programmable read-only memory) to encode that control logic, fonts or other resources.

According to embodiments in one regard, after receiving the output representation 118 the device engine 126 may render a preview 120 of the output derived from output representation 118 to be printed or otherwise output by output device 114. In embodiments the preview 120 may be directed back to mediation engine 108 or other resources, for instance before printing or otherwise physically generating output. The preview 120 may be presented to a user to review and manipulate before printing or other action. For example, the user may view the preview 120 to adjust contrast, shading, brightness, insert or remove page numbers, headers or footers, page size, font size, or otherwise adjust or manipulate the intended output.

In terms of preview generation, in embodiments the preview 120 may for example include a bitmap of the output content, for example read from a printer buffer, along with the commands, instructions or data generated by the device engine 126, which may also be captured and directed to mediation engine 108. A user command to darken a pending print page or other output shown in preview 120 displayed on host 112 may in embodiments for example operate on the corresponding bitmap content to darken and return that bitmap to output device 114, and cause a darkened output effect. In other embodiments, a similar user command may cause the mediation engine 108 to adjust the device instructions themselves to increase print darkness, for example by increasing a darkness value, and return those instructions to device engine 126 to generate a darkened bitmapped output in output device 114.

In embodiments the user may receive a further or updated preview 120 of the pending output as adjustments are made, and repeatedly view or manipulate that output as desired. In embodiments the user may also temporarily or permanently store the updated or adjusted output representation 118, preview 120 or other versions or representations of output object 116, as desired.

Figure 4:
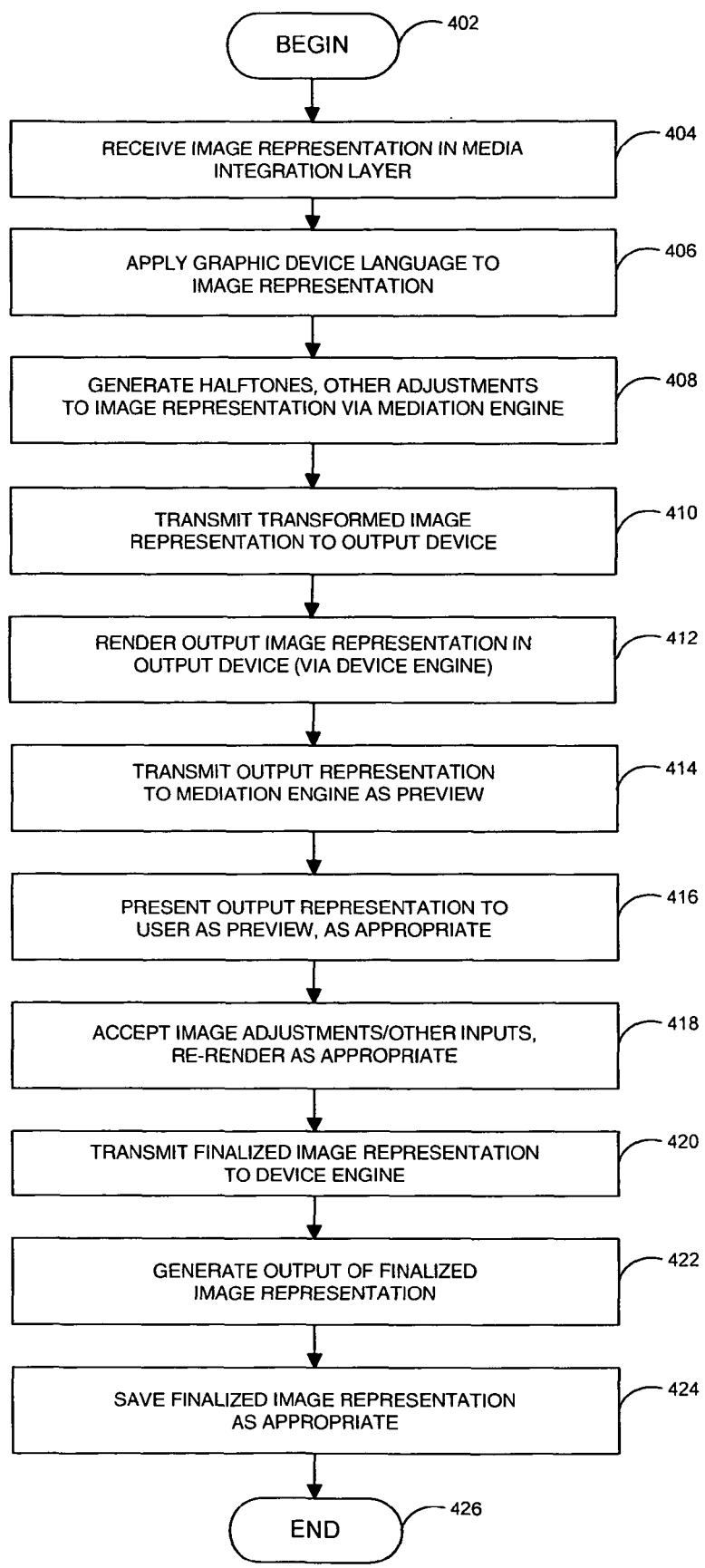
FIG. 4 illustrates a flowchart of overall image rendering processing, according to an embodiment of the invention.

FIG. 4 illustrates overall output rendering and associated preview and other processing, according to an embodiment of the invention. In step 402, processing may begin. In step 404, an output object 116 may be received in media integration layer 104 of operating system 102. In step 406, a graphic device language (GDL) or other rendering or translation resource may be applied to output object 116, for instance to generate output characteristics compatible with output device 114 based on the content of output object 116. In step 408, adjustments to or conditioning of the content of output object 116 may be generated, for instance via rendering engine 106 and/or mediation engine 108 to create or adjust half tones or other grayscale parameters, shading, three-dimensional effects, meshes, scaling, kerning or other effects. In step 410, the resulting output representation 118 may be transmitted to output device 114, for example in the form of or embedded in an electronic document of the type described in co-pending U.S. patent application Ser. No. 10/836,327 filed Apr. 30, 2004, entitled "Document Markup Methods and Systems", or otherwise.

In step 412, the output representation 118 may be rendered in output device 114 using device engine 126, for instance the print control logic of a printer, such as an inkjet, laser, dye sublimation or other printer or other driver of other output hardware. In step 414, the device engine 126 may transmit the rendering of the output representation 118 to the mediation engine 108, for example to view that rendering as a print or other preview on host 112, which may be or include a computer, workstation or other client or other machine. In step 416, the rendering of the output representation 118 may be presented as a preview 120 to a user, for example via a graphical user interface depicting a version of the page or other output to be printed, faxed or otherwise output, for instance scaled to page or other size.

In step 418, a user may supply adjustments or other inputs based on the preview 120, for example, to darken a graphical image, remove drop-shadowing or highlighting in textual output, suppress page numbers or headers, or other adjustments or actions. User adjustments may be incorporated and transmitted to the output device 114 for printing, faxing or other output or activity, for example via a print queue or other operating system or other service. In step 420, after incorporating user adjustments as appropriate, a finalized output representation may be transmitted to device engine 126. In step 422, the printed page, facsimile transmission or other physical, electronic or other output may be generated by output device 114. In step 424, the finalized image representation may be saved to disk or other storage if desired, as appropriate. In step 426, processing may repeat, return to a prior processing point, jump to another processing point or end.

The foregoing description of the invention is illustrative, and modifications in configuration and implementation will occur to persons skilled in the art. For instance, while the invention has generally been described in terms of a mediation engine mediating the output of a computer host communicating an image to a printer, in embodiments other devices could act as a source of an image, while other devices could likewise be employed to generate physical output. Likewise while the invention has generally been described in terms of an integral media layer distributing output requests through a mediation engine within an operating system, in embodiments the logic and control of the user screen and output rendering could be distributed in other resources inside or outside the operating system.

Moreover while the invention has generally been described in terms of the host 112 operating in the form of a personal computer, workstation or other client machine creating or storing the document, image or other representation being printed or output, in embodiments a print server or other networked or other resource could function as host, to condition or mediate the output representation 118 and perform other tasks.

Similarly, while the invention has in embodiments been described as rendering a textual document or graphical image to output, other types or varieties of output may be processed according to the invention. Other hardware, software or other resources described as singular may in embodiments be distributed, and similarly in embodiments resources described as distributed may be combined. Further, while the invention has generally been described in terms of transmitting a an output object to a single output device, in embodiments a page image, graphical image or other output object could be rendered and transmitted from one source object to multiple output devices. The scope of the invention is accordingly intended to be limited only by the following claims.

We claim:

1. A computer system for generating an output representation, the computer system comprising a processor coupled to a computer storage medium, the computer storage medium having stored thereon a plurality of computer software components executable by the processor, the computer software components comprising:
    an input interface to receive an electronic document;
    a rendering engine that is configured for communicating with the input interface to receive the electronic document, and for generating a set of device independent primitives from the electronic document by applying graphical device language (GDL) thereto, wherein the device independent primitives include standardized graphical output functions that represent content of the electronic document;
    a mediation engine for conditioning the set of device independent primitives into the output representation, wherein conditioning comprises:
        (a) automatically accessing functionality specific to an output device via a device driver that is capable of communicating with various output devices;
        (b) examining the output-device functionality to negotiate high-quality output and determining whether the device independent primitives are optimally expressed when compared against the examined output-device functionality;
        (c) when the output-device functionality is specific to the output device, substituting or adding routines to the set of device independent primitives based on the output device-specific functionality, wherein the conditioned set of device independent primitives form the output representation that is compatible with the output device without the use of additional device drivers; and
        (d) when the output-device functionality is not specific to the output device, reverting to the initially generated set of device independent primitives; and
    the device driver that acts as an output interface to the various output devices including the output device, the output device being configured to generate output based on the output representation.

2. The computer system according to claim 1, wherein the input interface comprises an application interface.

3. The computer system according to claim 2, wherein the electronic document comprises at least one of a textual document, a graphical image, and a presentation object received via the application interface.

4. The computer system according to claim 1, wherein the output device comprises at least one of a printer device, a facsimile device, a copy device, a multifunction device and a film device.

5. The computer system according to claim 1, wherein the rendering engine is associated with an operating system.

6. The computer system according to claim 1, wherein the mediation engine is associated with an operating system.

7. The computer system according to claim 1, wherein the output device generates a preview of the output.

8. The computer system according to claim 7, wherein the preview is presented to a user for adjustment before output.

9. The computer system according to claim 1, wherein the mediation engine is hosted in at least one of a client machine and a print server.

10. The computer system according to claim 1, wherein the rendering engine generates a display representation of the electronic document to display to a user based on the electronic document.

11. A method for generating an output representation, comprising:
    receiving an electronic document;
    generating an output representation of the electronic document via a rendering engine; and
    communicating the output representation to a mediation engine for transmission to an output device, wherein the mediation engine is configured for conditioning the output representation utilizing functionality specific to the output device that is accessed therefrom, wherein conditioning comprises:
        (a) automatically accessing functionality specific to the output device via a device driver that is capable of communicating with various output devices;
        (b) examining the output-device functionality to negotiate high-quality output and determining whether the output representation is optimally expressed when compared against the examined output-device functionality;
        (c) when the output-device functionality is specific to the output device, substituting or adding routines to the output representation based on the output device-specific functionality, wherein the conditioned output representation includes commands and data that are compatible with the output device without the use of additional device drivers, and wherein the output device being configured to generate output based on the output representation; and
        (d) when the output-device functionality is not specific to the output device, reverting to the initially generated output representation;
    deriving a preview of the output from the output representation that is transmitted to the output device;
    rendering the preview, wherein the preview is presented to a user;
    receiving user-initiated commands to manipulate the preview; and
    updating the output by operating directly on the output representation, wherein operating comprises adjusting the output representation based on the received user-initiated commands.

12. A method according to claim 11, wherein the step of receiving comprises receiving an electronic document via an application interface.

13. A method according to claim 12, wherein the electronic document comprises at least one of a textual document, a graphical image, and a presentation object received via the application interface.

14. A method according to claim 11, wherein the output device comprises at least one of a printer device, a facsimile device, a copy device, a multifunction device and a film device.

15. A method according to claim 11, wherein the rendering engine is associated with an operating system.

16. A method according to claim 11, wherein the mediation engine is associated with an operating system.

17. A method according to claim 11, wherein the step of deriving a preview of the output is performed via the output device.

18. A method according to claim 11, wherein the mediation engine is hosted in at least one of a client machine and a print server.

19. A method according to claim 11, wherein the rendering engine generates a display representation of the electronic document to display to a user based on the electronic document.

20. A transmissible representation of an electronic document for output, the representation being generated according to a method comprising:
    receiving an electronic document;
    generating an output representation of the electronic document via a rendering engine; and
    communicating the output representation to a mediation engine for transmission to an output device, wherein the mediation engine is configured to implement a management process comprising:
        (a) communicating with the output device to identify device-specific functionality available thereon, wherein communicating is conducted via a device driver that is capable of communicating with various output devices;
        (b) examining the output-device functionality to negotiate high-quality output and determining whether the output representation is optimally expressed when compared against the examined output-device functionality;
        (c) when the output-device functionality is specific to the output device, conditioning the output representation based on the identified device-specific functionality such that the conditioned output representation contains parameters that are compatible with the output device without further conversion or the use of additional device drivers, the output device being configured to generate output based on the output representation; and
        (d) when the output-device functionality is not specific to the output device, reverting to the initially generated output representation;
    deriving a preview of the output from the output representation that is transmitted to the output device;
    rendering the preview, wherein the preview is presented to a user;
    receiving user-initiated commands to manipulate the preview; and
    updating the output by operating directly on the output representation, wherein operating comprises adjusting the output representation based on the received user-initiated commands.

21. A representation according to claim 20, wherein the step of receiving comprises receiving an electronic document via an application interface.

22. A representation according to claim 21, wherein the electronic document comprises at least one of a textual document, a graphical image, and a presentation object received via the application interface.

23. A representation according to claim 20, wherein the output device comprises at least one of a printer device, a facsimile device, a copy device, a multifunction device and a film device.

24. An output of an electronic document, the output being generated according to a method comprising:
    receiving an electronic document;
    generating an output representation of the electronic document via a rendering engine;
    communicating the output representation to a mediation engine for transmission to an output device, wherein the mediation engine is configured for conditioning the output representation, wherein conditioning comprises:
        (a) automatically accessing functionality specific to an output device via a device driver that is capable of communicating with various output devices;
        (b) examining the output-device functionality to negotiate high-quality output and determining whether the output representation is optimally expressed when compared against the examined output-device functionality;
        (c) when the output-device functionality is specific to the output device, substituting or adding routines to the output representation based on the output device-specific functionality, wherein the conditioned output representation is compatible with the output device without the use of additional device drivers; and
        (d) when the output-device functionality is not specific to the output device, reverting to the initially generated output representation;
    utilizing the device driver, which acts as an output interface to the various output devices including the output device, to transmit the output representation to the output device; and
    generating the output via the output device based on the output representation.

25. An image output according to claim 24, wherein the electronic document comprises at least one of a textual document, a graphical image, and a presentation object received via the application interface.

26. An image output according to claim 24, wherein the image output comprises at least one of a printed output, a facsimile output, a copy output, a multifunction output and a film output.

27. One or more hosts that perform a method for generating an output representation, the method comprising:
    receiving an electronic document;
    generating an output representation of the electronic document via a rendering engine; and
    communicating the output representation to a mediation engine for transmission to an output device, wherein the mediation engine is configured to implement a management process comprising:
        (a) communicating with the output device to identify functionality available thereon, wherein communicating is conducted via a device driver that is capable of communicating with various output devices; and
        (b) examining the output-device functionality to negotiate high-quality output and determining whether the output representation is optimally expressed when compared against the examined output-device functionality;
        (c) when the output-device functionality is specific to the output device, conditioning the output representation based on the identified device-specific functionality such that the conditioned output representation contains parameters that are compatible with the output device without further conversion or the use of additional device drivers, the output device being configured to generate output based on the output representation; and (d) when the output-device functionality is not specific to the output device, reverting to the initially generated output representation;

deriving a preview of the output from the output representation that is transmitted to the output device;

rendering the preview, wherein the preview is presented to a user;

receiving user-initiated commands to manipulate the preview; and updating the output by operating directly on the output representation, wherein operating comprises adjusting the output representation based on the received user-initiated commands.

28. The one or more hosts according to claim 27, wherein the electronic document comprises at least one of a textual document, a graphical image, and a presentation object received via the application interface.

29. The one or more hosts according to claim 27, wherein the output device comprises at least one of a printer device, a facsimile device, a copy device, a multifunction device and a film device.

* * * * *